COLOR IMAGE REPRODUCTION DEVICE

Filed Oct. 16, 1970 4 Sheets-Sheet 1

INVENTORS
ISAO OTA
TETSURO OTSUKA

BY Wenderoth, Lind & Ponack
ATTORNEYS

INVENTORS
ISAO OTA
TETSURO OTSUKA

BY Wenderoth, Lind & Ponack
ATTORNEYS

Sept. 5, 1972 ISAO OTA ET AL 3,689,400

COLOR IMAGE REPRODUCTION DEVICE

Filed Oct. 16, 1970 4 Sheets-Sheet 3

INVENTORS
ISAO OTA
TETSURO OTSUKA

BY Wenderoth, Lind & Ponack
ATTORNEYS

Sept. 5, 1972 ISAO OTA ET AL 3,689,400

COLOR IMAGE REPRODUCTION DEVICE

Filed Oct. 16, 1970 4 Sheets-Sheet 4

INVENTORS
ISAO OTA
TETSURO OTSUKA

BY Wenderoth, Lind & Ponack
ATTORNEYS

United States Patent Office 3,689,400

Patented Sept. 5, 1972

3,689,400

COLOR IMAGE REPRODUCTION DEVICE

Isao Ota, Osaka-shi, and Tetsuro Otsuka, Takatsuki-shi, Japan, assignors to Matsushita Electric Industrial Co., Ltd., Osaka, Japan Filed Oct. 16, 1970, Ser. No. 81,290
Claims priority, application Japan, Oct. 18, 1969, 44/83,561
Int. Cl. B01k 5/00
U.S. Cl. 204—300 21 Claims

ABSTRACT OF THE DISCLOSURE

A photoelectrophoretic color image reproduction device in which an electrophoretic suspension layer having a white colored suspending medium and at least three differently colored photosensitive electrophoretic materials in the form of finely divided powder suspended in said white colored suspending medium is interposed between a pair of electrodes. The three differently colored photosensitive electrophoretic materials are cyan colored material which is principally photosensitive to red light, magenta colored material which is principally photosensitive to green light, and yellow colored material which is principally photosensitive to blue light. Means are included to impose a D.C. electric field across the electrophoretic suspension layer between the electrodes and to expose the electrophoretic suspension layer to a color image through the transparent electrode, said electric field acting to change, in cooperation with the color image, the electrophoretic property of the photosensitive electrophoretic materials so as to change electrophoretically the spatial distribution of the photosensitive electrophoretic materials, in order to reproduce the color image.

BACKGROUND OF THE INVENTION

This invention relates to a color display and/or recording device and particularly to a photoelectrophoretic color display and/or recording device comprising at least three differently colored photosensitive electrophoretic materials suspended in a white colored suspending medium.

Various methods or apparatus for producing a color image by photoelectrophoresis are described, for example, in U.S. Pats. 2,940,847 to Kaprelian, 3,383,993 to Yeh, 3,384,488 and 3,384,565 to Tulagin and Carreira, and 3,384,566 to Clark.

According to these prior art methods, charged particles in a colorless suspending medium are transported to the surface of an electrode so as to reproduce a pattern corresponding to that of an input light image. The visible color image can be obtained by removing the electrode from the surface of the suspension, so that the suspension cannot be enclosed in a housing. The particles act as the primary image colorant but the suspending medium does not because it is not colored. That is, the prior art does not seek to bring about a variation in the optical reflective property of a suspension itself due to a change in the spatial distribution of photosensitive electrophoretic particles in the suspension. Therefore, the prior art relates essentially to the reproduction of a permanent visible image but not to a changeable color display system.

SUMMARY OF THE INVENTION

An object of this invention is to provide a device for display and/or recording of a color image, in which is enclosed an electrophoretic suspension layer having at least three differently colored photosensitive electrophoretic materials which have different photosensitive responses from each other and are suspended in a white colored suspending medium.

A further object of this invention is to provide a device for reproducing a positive and/or negative color image in a fast and simple manner. A still further object of this invention is to provide a large and/or flat or flexible color image display panel comprising an electrophoretic suspension layer.

These objects are achieved by a device for display and/or recording according to the present invention which comprises an electrophoretic suspension layer including a dispersion of at least tnree differently colored photosensitive electrophoretic materials in a white finely divided powder form suspended in a colored suspending medium. Said at least three differently colored photosensitive electrophoretic materials have different photosensitive responses from each other. Said suspension layer has two opposite major surfaces; a first transparent electrode and a second electrode which are opposed to each other are positioned on said two opposite major surfaces of said suspension layer. Means is provided for applying a D.C. electric field across said suspension layer through said electrodes. A D.C. electric field is applied across the suspension layer between the electrodes and nearly simultaneously the suspension layer is exposed to a color image, whereby said color image is reproduced on the suspension layer.

Other objects and advantages of this invention will be apparent from the following description, the accompanying drawings and the appended claims.

The sizes and shapes of the elements of the drawings should not be considered as actual sizes or even proportional to actual sizes because many elements have been purposely distorted in size or shape in order to more fully and clearly describe the invention.

DETAILED DESCRIPTION OF THE DRAWINGS

Figure 1A:
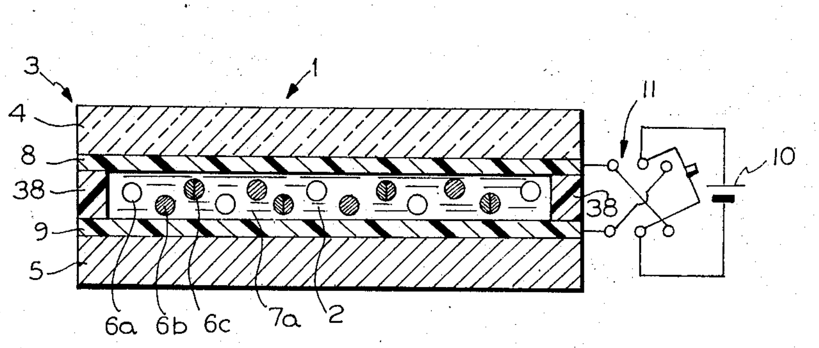
FIGS. 1*a*–1*d* are cross-sectional views of a color image reproduction panel in accordance with this invention.

Referring to FIG. 1*a*, reference character 1 designates, as a whole, a photoelectrophoretic color image reproduction panel which has an electrophoretic suspension layer 2 therein.

When said suspension layer 2 is in a fluid state, it is enclosed in a housing 3 having a frame 38 and two opposite major housing walls 4 and 5 which are, for example, both transparent. Said suspension layer 2 has two opposite major surfaces along said two opposite major housing walls 4 and 5 and includes a dispersion of photosensitive electrophoretic material 6 in a finely divided powder form suspended in a white colored suspending medium 7*a*. The material 6 consists of at least three differently colored photosensitive electrophoretic materials which are different in their photosensitive responses from each other.

The material 6 consists of at least three kinds of photosensitive electrophoretic materials *6a*, *6b*, and *6c*, the colors of which are cyan, magenta and yellow, respectively, and have photosensitive responses to red, green and blue light, respectively. The color of the suspending medium *7a* is white.

The particles of the material 6 are shown greatly enlarged in this and subsequent figures for clarity of illustration. Said two opposite major surfaces of said suspension layer 2 are in contact, respectively, with a first electrode 8 and a second electrode 9 which are, for example, both transparent and are attached to the inner surfaces of said two opposite major housing walls 4 and 5.

Said first electrode 8 and second electrode 9 are connected to output terminals of a D.C. voltage source 10 through a switching device 11. Before a D.C. electric field is supplied to said suspension layer 2 from said D.C. voltage source 10, the photosensitive electrophoretic material 6 in a finely divided powder form is distributed uniformly throughout the suspending medium *7a* as shown in FIG. 1*a* and the suspension layer 2 appears gray at both electrodes 8 and 9 under the illumination of, for example, an incandescent lamp. The gray color is the color which is a subtractive mixture of the colors of the cyan material *6a*, magenta material *6b*, the yellow material *6c* and the white suspending medium *7a*. In this and following figures the illumination source is omitted from the drawing. When the gray suspension layer 2 is subjected to a D.C. electric field by said D.C. voltage source 10 and the switching device 11 without the panel being illuminated, the photosensitive electrophoretic materials *6a*, *6b* and *6c* are caused to move electrophoretically in a direction either to the cathode or to the anode, depending upon their polarity. For example, if the materials *6a*, *6b* and *6c* originally have positive polarity in said colored suspending medium *7a*, they move electrophoretically and are deposited on the cathode 8 in a spatial distribution as shown in FIG. 1*b*.

The resultant suspension layer 2 has a different spatial distribution of the material 6 and a different optical reflective property from the original suspension layer 2 having the uniform distribution of the material 6. When one observes the panel 1 under illumination after the removal of the applied voltage, the panel 1 is white at the electrode 9 because the layer of the white suspending medium *7a* hides the colored material 6 deposited on the electrode 8. On the other hand, the panel 1 appears black on the electrode 8 which is a subtractive mixture of the colors of the materials *6a*, *6b* and *6c*.

Figure 1B:
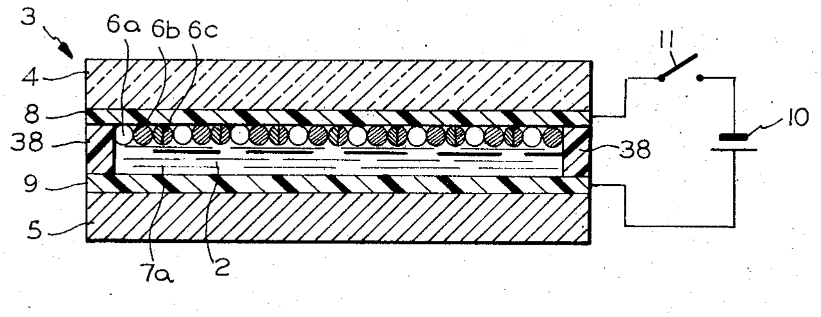
Figure 1C:
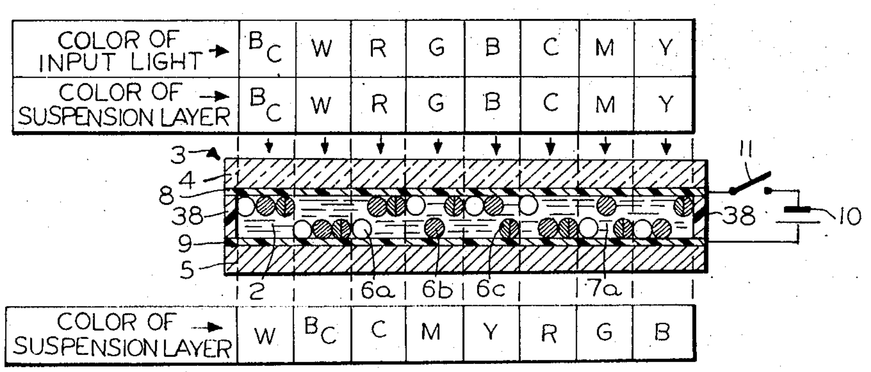

When the suspension layer 2 is exposed to a color image, for example, a positive color image (represented by the arrows) through the transparent electrode 8 as shown in FIG. 1*c* while the electrodes 8 and 9 are connected to the cathode and the anode terminals of the voltage source 10, respectively, the photosensitive electrophoretic material 6 exposed to the actinic light has a reduced resistivity and therefore a charge exchange occurs between the material 6 and the electrode 8 so as to change the original charge polarity of the material 6. That is, the material *6a*, *6b* or *6c* exposed to the actinic light comprising red light, green light or blue light, respectively, has the charge polarity changed. For example, white light in the input color image changes the charge polarities of all the materials *6a*, *6b* and *6c* exposed to the white light; red, green or blue light in the input color image selectively changes the charge polarities of only the material *6a*, *6b* or *6c*, respectively; cyan, magenta or yellow light in the input color image changes the charge polarities of the materials *6b* and *6c*, *6a* and *6c*, or *6a* and *6b*, respectively. The material 6 negatively charged by acquiring a negative charge from the cathode 8 is repulsed from the cathode 8 and moves toward the anode 9 and is deposited thereon. The material 6 exposed to no light or light to which it is not photosensitive does not exchange any charge with the electrode 8 because of its original high resistivity and remains deposited on the cathode 8. The spatial distribution of the material 6 in the suspension layer 2 changes corresponding to the input color image as shown in FIG. 1*c*. In FIG. 1*c* and other figures and hereafter in the specification Bc, W, R, G, B, C, M and Y means black, white, red, green, blue, cyan, magenta and yellow, respectively. The upper line of symbols represents the colors of the light from the input color image, and the second and third lines represent the colors produced at the surfaces of the suspension layer 2 by the change in spatial distribution of the material 6. When the applied voltage is removed and the panel 1 is illuminated with, for example, an incandescent lamp at both electrodes 8 and 9, one can observe a positive color image at the electrode 8 and a negative color image at the electrode 9. The material 6 and the suspending medium *7a* both act as the colorant in the reproduced image. If the suspending medium *7a* is colorless, both of the areas subjected to black light or white light will have the same color, that is, a black color, at both electrodes 8 and 9 in FIG. 1*c*.

In the above situation, a D.C. voltage is applied across the suspension layer 2 so as to produce a spatial distribution of the material 6 as shown in FIG. 1*b* before the suspension layer 2 is exposed to a color image. But one can apply the D.C. voltage at the same time the original suspension layer 2 having a uniform spatial distribution of the material 6 as shown in FIG. 1*a* is exposed to the color image, or after the suspension layer 2 begins to be exposed to the color image. If the material 6 has a reduced resistivity after the input color image is removed, a D.C. voltage can be applied across the suspension layer 2 during reduction of the resistivity of the material 6 after the exposure of the suspension layer 2 to the color image is stopped.

When a D.C. voltage of reversed polarity is applied across the suspension layer 2 having a spatial distribution of the material 6 as shown in FIG. 1*c*, while no actinic light is applied to the panel, the suspension layer 2 will have the opposite spatial distribution of the material 6 from that as shown in FIG. 1*c*. When one observes the panel 1 under white light after the applied voltage with reversed polarity is removed, a negative color image and a positive color image are observed at the electrodes 8 and 9, respectively.

As is apparent from the foregoing description, the photoelectrophoretic color image reproduction device of the present invention can reproduce a positive and/or negative color image in one step when an electric field and an input color image are applied to the suspension layer 2. When an input image exposed to the suspension layer 2 is a black and white image, the suspension layer 2 displays, of course, the black and white image in a positive and/or negative form. A black and white image is a particular species of a color image.

The panel 1 can be used as a changeable display device in the manner described below. The images reproduced at the electrodes 8 and 9 as shown in FIG. 1*c* can be easily erased by applying a D.C. voltage across the suspension layer 2 while white light is projected uniformly on the suspension layer 2 through the electrode 9 while the electrodes 8 and 9 are charged as a cathode and an anode respectively, the images reproduced as shown in FIG. 1*c* are erased and the suspension layer 2 has a spatial distribution of the material 6 as shown in FIG. 1*b*. A new image can be reproduced on the resultant suspension layer 2 in a manner similar to that described in the foregoing section. When the white light used for erasure is projected uniformly on the suspension layer 2 through the electrode 8 during application of a first D.C. voltage between the electrodes 8 and 9, the material 6 moves and is deposited on the electrode 9. After that, a new color image is projected through the electrode 8 onto the suspension layer 2 having the material 6 deposited on the electrode 9 during application of a second D.C. voltage with reversed polarity with respect to the first D.C. voltage across the suspension layer 2.

In the foregoing section, it is assumed that the photosensitive electrophoretic material 6 in the suspension layer 2 changes its charge polarity at the electrode under the influence of actinic light and the applied electric field. But it is not always necessary for the photosensitive electrophoretic material 6 to change its charge polarity. The image can also be reproduced when the photosensitive electrophoretic material 6 changes the amount of its charge, and as a result of charge exchange with the electrode under the influence of actinic light and the applied electric field, the electrophoretic mobility is changed.

Figure 1D:
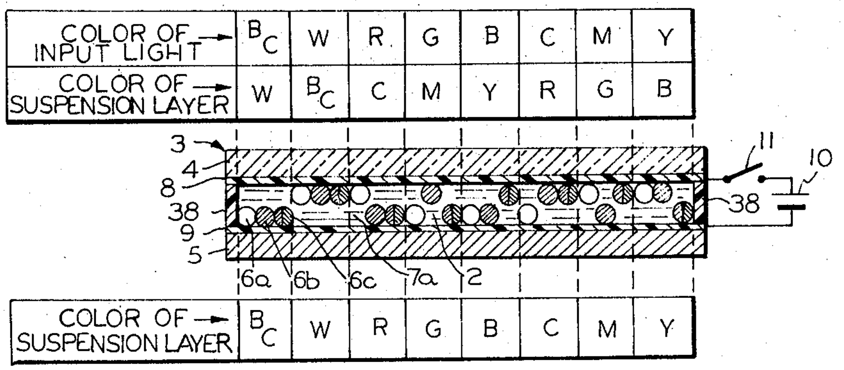

For example, when a D.C. voltage and a color image are applied through the electrode 8 to the suspension layer 2 having a spatial distribution of the material 6 as shown in FIG. 1*b*, originally positively charged material 6, by absorbing the actinic light, has its resistivity reduced and therefore the amount of its positive charge is reduced as a result of charge exchange with the cathode 8. If the reversed D.C. voltage is applied between the electrodes 8 and 9 after the cathode 8 has neutralized the original positive charge of the material 6 which absorbed the actinic light and then the exposure of the suspension layer 2 to the light image is stopped, the material 6 with its original positive charge and which has not been exposed to the actinic light moves electrophoretically toward the cathode 9 and is deposited on the cathode 9, but the material 6 electrically neutralized by the influence of the actinic light and applied electric field cannot move and is kept deposited on the anode 8 as shown in FIG. 1*d*. A negative color image and a positive color image are observed at the electrodes 8 and 9, respectively, when they are illuminated after the D.C. voltage is removed. Even when the original positive charge of the material 6 which absorbed actinic light is not completely neutralized and the material 6 has only a reduced positive charge, the material 6 with reduced positive charge has a reduced electrophoretic mobility, and therefore moves toward the cathode 9 under the reversed electric field at a lower velocity than that of the material 6 in the area not exposed to the actinic light. When a large amount of the material 6 in the area not exposed to actinic light is deposited on the cathode 9 and the material 6 having reduced positive charge does not quite reach the cathode 9, when the applied D.C. voltage with reversed polarity is removed the images are reproduced at the electrodes 8 and 9 in nearly the same way as shown in FIG. 1*d*.

It is also possible to reproduce a color image by increasing the amount of charge and therefore increasing the electrophoretic mobility of the material 6. For example, if the material 6 suspended as shown in FIG. 1*a* is originally in an electrically nearly neutral condition, and a D.C. voltage is applied across the suspension layer 2 while a color image is projected on the suspension layer 2 through, for example, the electrode 8, a color image is reproduced. The originally electrically neutral material 6 which comes into contact with the electrode 8 by, for example, Brownian motion acquires a charge from the electrode 8 under the influence of the actinic light and the applied electric field, and moves electrophoretically toward the electrode 9 and is deposited thereon so that positive and negative color images are reproduced on the electrodes 8 and 9, respectively. If the material 6 is not electrically neutral and originally has a weak charge, for example, a weak positive charge and a spatial distribution as shown in FIG. 1*a*, when a D.C. voltage is applied between the electrodes 8 and 9, as a cathode and an anode, respectively, it transfers the positive material 6 to the cathode 8. After that, a color image is projected on the suspension layer 2 through the electrode 8 and simultaneously a D.C. voltage with reversed polarity is applied between the electrodes 8 and 9. Originally positive material 6 on the electrode 8 has its positive charge increased by acquiring a positive charge from the anode 8 under the influence of the actinic light and the applied electric field. The material 6 which has absorbed actinic light and acquired a strong positive charge moves electrophoretically toward the cathode 9 at a high speed but the material 6 which has absorbed little actinic light moves at a low speed under the influence of the applied voltage because of its lower electrophoretic mobility.

By removing the applied voltage after a suitable length of time, the reproduced images can be obtained at the electrodes 8 and 9.

The electrophoretic property, that is, charge polarity or electrophoretic mobility, of the photosensitive electrophoretic material 6 changes due to a charge exchange with the electrode under the influence of the actinic light and applied electric field. The change in the electrophoretic property of the material 6 depends upon the photosensitivity of the material 6, the strength of the projected actinic light, the length of time it is exposed to the actinic light, the strength of the applied electric field, the length of time of application of the applied electric field, the electrical property of the suspending medium, the surface conditions of the electrode and the material 6, and so on. The advantage of producing a color image by changing the electrophoretic mobility of the material 6 is the high sensitivity of the materials so that a color image can be reproduced by an input of a dark image and/or a short length of time of application of a D.C. voltage and/or those of a low applied voltage.

The photosensitive electrophoretic material 6 in this invention can be any suitable and available material in a finely divided powder form which can have its electrophoretic property changed, that is, the charge polarity or electrophoretic mobility is changed when it is exposed to actinic light and is subjected to an electric field. Photosensitive electrophoretic materials 6 which will be operable are, for example, cadmium sulfide, cadmium sulfoselenide, zinc oxide, titanium dioxide, zinc sulfide, sulphur, selenium, mercuric sulfide, lead oxide, lead sulfide, phthalocyanines, azo compounds, quinacridones or anthraquinones. Cyan, magenta and yellow-colored photosensitive electrophoretic materials which are photosensitive to red, green and blue light, respectively, are known, such as for example, Monolite Fast Blue GS (the alpha form of metal free phthalocyanine), Watchung red B (a barium salt of 1-(4′-methyl-5′-chloroazobenzene-2′-sulfonic acid)-2-hydroxy-3-naphthoic acid and Algol Yellow GC (1,2,5,6 - di(C,C′-diphenyl)-thiazole-anthraquinone), respectively. The material 6 can be only the pure photosensitive material, or can be a sensitized form thereof, solid solutions or dispersions of the photosensitive material in a resin binder, multilayers of particles in which the photosensitive material is included in one of the layers and where the material in the other layers provide a light filtering action in an outer layer.

Preferably the particle sizes of the material 6 are small so that the material 6 is present in the suspension layer in a stable dispersion which makes possible a reproduced image of high resolution. It is desirable that the material 6 have an average particle size up to about 10$\mu$.

The colored suspending medium 7*a* can be prepared so as to have the desired color by dissolving a colored substance, such as a dye, in a colorless liquid which is, for example, ligroin, kerosene, cyclohexane, carbontetrachloride, linseed oil or olive oil. It is preferred to add any suitable and available control agent such as a charge control agent, dispersion agent, stabilizing agent or sensitizing agent to the suspension layer to provide a stable and/or highly photosensitive suspension layer. A surface active agent, metallic soap, oil or resin dissolved in the suspension layer can act as the control agent in the present invention.

The housing 3 for the device according to the present invention can be prepared by using any available material which is inert to the suspending medium and the photosensitive electrophoretic material. For example, a plastic sheet having a major center portion cut out can be used as the frame 38 of the housing 3 as shown in FIG. 1*a*.

One of the opposite major housing walls can be prepared by adhering to the frame 38 a transparent plate 4 having the transparent electrode 8 formed thereon. An operable plate is a transparent glass plate having a transparent thin film of tin oxide ($SnO_2$) or cuprous iodide (CuI) formed thereon, or a transparent plastic sheet such as polyester, cellulose acetate or cellophane having a transparent thin film of cuprous iodide (CuI) or a thin metallic film thereon. The other of the two opposite major housing walls can be prepared by adhering to the frame 38 a transparent plate 5 having the transparent electrode 9 formed thereon. The transparent plate 5 having the electrode 9 attached thereon can be similar to the plate 4 having the electrode 8 thereon as described above. The housing 3 can have an inlet and an outlet, for example, at the three corners thereof. The electrophoretic suspension composed of at least two differently colored photosensitive electrophoretic materials in a finely divided powder form suspended in a colored suspending medium can be poured into the housing through the inlet formed in one corner of the housing. The inlet and the outlet are closed after the housing is filled with the suspension. A flexible image reproduction device can be prepared by using a flexible housing.

One can use any appropriate apparatus for applying an electric field across the suspension layer through the two electrodes. For example, a D.C. pulse generator, a battery or any other D.C. source can be used.

Figure 2A:
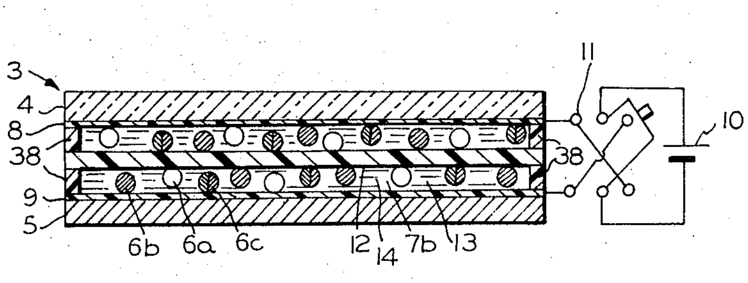
FIGS. 2*a* and 2*b* are cross-sectional views of another embodiment of a color image reproduction panel according to this invention.
Figure 2B:
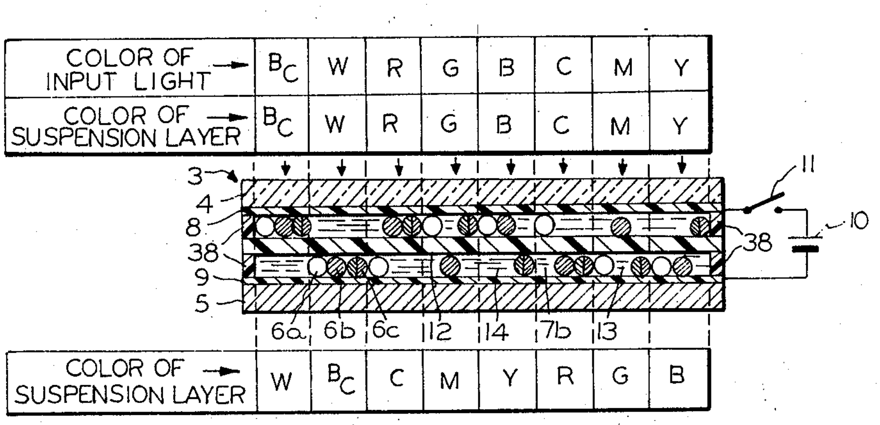

Referring to FIGS. 2*a* and 2*b*, wherein similar reference characters designate components similar to those of the foregoing figures, an electrophoretic suspension layer 14 consists of a dispersion of at least three differently colored photosensitive electrophoretic materials 6 suspended in a colored suspending medium **7*b*. The colored suspending medium 7*b* consists of a colorless liquid 13 having a porous colored layer 12 inserted therein. For example, the materials 6*a*, 6*b* and 6*c* and the colored suspending medium 7*b* together make up the suspension layer 14. When the porous layer 12 is white, the suspension layer 14 is usually gray at both electrodes 8 and 9 when illuminated by white light with an almost uniform spatial distribution of the material 6 throughout the suspension layer 14** as shown in FIG. 2*a*. When a D.C. electric field is applied across the suspension layer 14 between the electrodes 8 and 9, as a cathode and as an anode, respectively, and a color image is projected on the suspension layer 14 through the electrode 8 while the suspension layer 14 is subjected to the D.C. electric field, the photosensitive electrophoretic material 6 is given a reduced resistivity due to the absorption of the actinic light and exchanges its charge with the electrode 8 so that the electrophoretic property is changed in the same manner as described in connection with FIG. 1. If the material 6 has the charge polarity thereof changed, the material 6 having a negative charge moves electrophoretically toward the anode 9 and is caused to pass through the porous colored layer 12 and is deposited on the anode 9 under the effect of the applied electric field as shown in FIG. 2*b*. After removal of the applied voltage and the projected color image, a positive color image and a negative color image appear at the electrodes 8 and 9, respectively, when they are illuminated. In a manner similar to that described in connection with FIG. 1, images can be reproduced with great sensitivity by using a change in the electrophoretic mobility of the material 6.

Colored porous layer 12 in the present invention can be made from any colored sheet material having pores therein. The pores must be large enough to pass the particles of the electrophoretic material 6 therethrough and small enough to hide the electrophoretic material 6 from sight. Operable materials are such materials as a cloth or a mesh woven of natural or artificial fibers; a fibroid sheet having thousands of irregular pores; a thin plate with a lot of tiny holes; and a sheet of granular material bound together with resin or an adhesive agent so as to form a larger number of pores. Colorless suspending media 13 which are operable are insulating liquids such as, for example, ligroin, kerosene, olive oil, linseed oil, cyclohexane, paraffin liquid, mineral oil or trichlorotrifluoroethane.

Figure 3A:
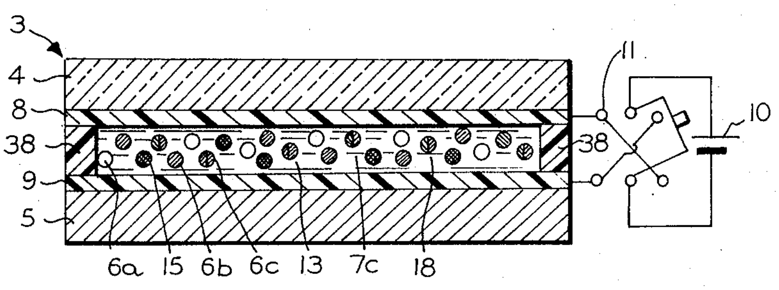
FIGS. 3*a* and 3*b* are cross-sectional views of still another embodiment of a color image reproduction panel according to this invention.
Figure 3B:
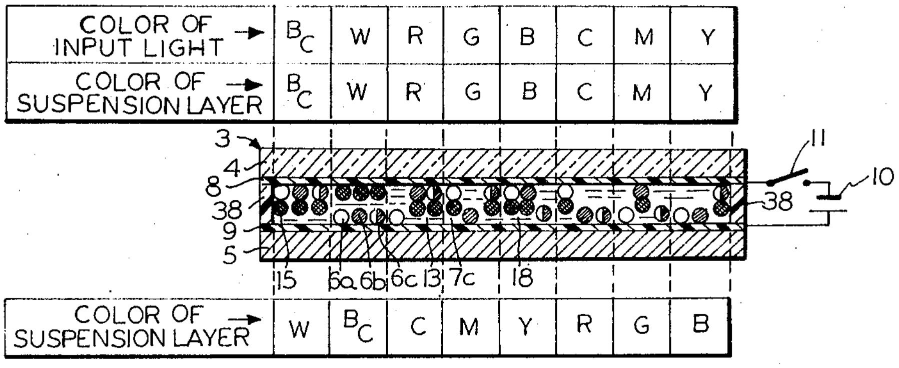

Referring to FIGS. 3*a* and 3*b*, wherein similar reference numbers designate components similar to those of the foregoing figures, a colorless liquid 13 has at least one colored material 15 in the form of a finely divided powder suspended therein. The colorless liquid 13 and the colored material 15 suspended therein together make up the colored suspending medium **7*c*. At least three differently colored photosensitive electrophoretic materials 6 in the form of a finely divided powder are suspended in the colored suspending medium 7*c* and together the liquid 13, the powder 15, and the electrophoretic materials 6 make up the electrophoretic suspension layer 18** as shown in FIG. 3*a*. Colored materials 15 which are operable are dyes, colored liquid particles which are insoluble in the suspending liquid 13, or pigment particles such as, for example, titanium dioxide, zinc oxide, lithopone, or aluminum powder. If the colored material 15 is white and has the same charge polarity, for example, positive polarity, as the original charge polarity of the photosensitive electrophoretic material 6 and the material 6 originally has a larger electrophoretic mobility than the material 15, application of a D.C. voltage across the suspension layer 18 while a color image is projected on the suspension layer 18 through the cathode changes the electrophoretic property, for example, the charge polarity, of the material 6 exposed to actinic light and causes the negatively charged material 6 to move electrophoretically toward an anode 9. There are three kinds of material 6, that is, cyan material **6*a*, magenta material 6*b* and yellow material 6*c*. In the area on which no actinic light is projected on the panel, the applied D.C. electric field first mainly causes the material 6 to be deposited on the cathode 8, and later causes mainly the material 15 to be deposited thereon. On the area of electrode 8 on which white light is projected only the material 15 is deposited and, for example, in an area where red light is projected mainly magenta material 6*b* and yellow material 6*c* are deposited on the electrode 8 and the white material 15 is mainly deposited on the underside of the layer of a mixture of the materials 6*b* and 6*c*. Thus the suspension layer 18 in this area appears through the electrode 8 to have a red color which is a mixture of the colors of the materials 6*b* and 6*c***, as shown schematically in FIG. 3*b*. Similar effects are produced in areas where other color light falls on the suspension layer 18 through the charged electrode 8, as shown schematically in FIG. 3*b*. In this manner positive and negative color images can be seen at the electrodes 8 and 9, respectively, when they are illuminated by white light after removal of the applied voltage. When the material 15 is electrically neutral, the colored suspending medium **7*c* is almost the same as the colored suspending medium 7*a***.

The colored suspending medium in the device of the present invention is opaque, and therefore can hide the colored photosensitive electrophoretic material 6 from sight and act as a colorant of the reproduced color image. Therefore, the reproduced color image can have colors consisting of: the respective colors of at least three differently colored photosensitive electrophoretic materials; a color which is a mixture of the colors of at least three differently colored photosensitive electrophoretic materials; the color of the colored suspending medium; and a color which is a mixture of the colors of the suspending medium and electrophoretic material. The electrophoretic suspension layer in accordance with the present invention having a white suspending medium and cyan, magenta and yellow colored photosensitive electrophoretic materials which have photosensitive responses in the red, green and blue light bands, respectively, can produce a color image having a very broad range of color reproduction. The reproduced image can have a halftone appearance. The halftone consists of a color which is a mixture of the colors of the suspending medium and electrophoretic material.

In the photoelectrophoretic image reproduction panel of the present invention as shown in FIGS. 1*a*-1*d*, 2*a* and 2*b* or 3*a* and 3*b*, it is not always necessary that both of the aforesaid two opposite major housing walls and both of the aforesaid first electrode and second electrode be transparent. It is possible to prepare a color image reproduction panel in which a reproduced image appears only at one side by employing one transparent housing wall and one transparent electrode corresponding to said one transparent housing wall. The other housing wall can be made of an opaque conductive plate such as, for example, a metal plate, which acts as one of the two electrodes.

The electrophoretic material in the form of a finely divided powder deposited on an electrode surface by electrophoresis will stay on the electrode even after removal of an applied electric field. This means that the image reproduction device according to the present invention can memorize the reproduced image without using further electric power. For producing a recorded image, that is, a hard copy, one can use, for example, suspending medium which is in a solid state at room temperature and in a liquid state above room temperature. Suspending media which are operable for this purpose are, for example, waxes such as beeswax, vegetable wax, paraffin or synthetic wax. Such wax can be colored by heating it above room temperature and adding dye or pigment particles thereto or by inserting a colored porous layer therein. When using such a wax as a suspending medium, the device according to the present invention must be kept at a temperature higher than room temperature for producing the display or recording. After the device is subjected to a D.C. electric field and a color image at the higher temperature to vary electrophoretically the spatial distribution of said electrophoretic material, it is cooled to room temperature to produce a recorded image. If it is desired to erase the recorded image, the device is subjected to a D.C. electric field and uniform actinic light at the higher temperature. A solvent softenable resin or the like can also be used as a suspending medium for producing a hard copy. Before application of an electric field and color image to the suspension layer having a solvent softenable suspending medium, a solvent or solvent vapor is applied to the suspending medium so as to soften it. Evaporation of solvent from the suspending medium after reproduction of an image leaves a hard copy in the suspension layer.

When the suspending medium consists of a thermosetting material which is in a liquid state at room temperature, one can produce a permanent display by heating the suspending medium after the electrophoretic movement of the photosensitive electrophoretic material. Thermosetting materials which are operable as suspending media are, for example, drying oil such as linseed oil, soya oil or tung oil. These oils are colored so as to have a white color by adding dye or pigment particles thereto or by inserting a colored porous layer therein.

When a colored suspending medium in a liquid state at room temperature includes a fixing agent dissolved therein such as, for example, polystyrol, vinyl acetate resin or linseed oil which fixes the electrophoretic material in the form of a finely divided powder, one can obtain a hard copy having a permanently visible image reproduced thereon by evaporating or exhausting the residual suspending medium after an image is reproduced. The evaporation or exhausting of the suspending medium can be achieved by, for example, evacuating the housing of the electrophoretic material in the suspending medium through an outlet formed, for example, in the housing wall.

It has been discovered according to this invention that when at least one of the aforesaid first electrode and second electrode is coated with an insulating layer which is in contact with the aforesaid suspension layer, the device according to the present invention has an improved operating life. The insulating layer prevents the breakdown of the insulating property of the suspension layer even when a high electric voltage is applied between the electrodes and prevents the photosensitive electrophoretic material which does not absorb the actinic light from exchanging a charge with the electrode. Even when the electrode is coated with an insulating layer, the coated electrode can change the electrophoretic property of the photosensitive material under the influence of the actinic light and the applied electric field.

Figure 4:
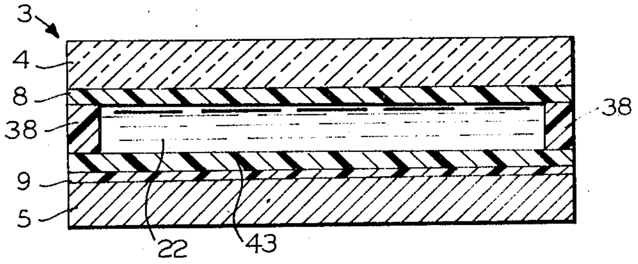
FIG. 4 is a cross-sectional view of another embodiment of a color image reproduction panel according to this invention.

Referring to FIG. 4, wherein similar reference numbers designate components similar to those of the foregoing figures, a suspension layer 22 is provided which can be any of the above described electrophoretic suspension layers, such as the suspension layer 2, 14 or 18 of FIG. 1*a*, 2*a* or 3*a*. A second electrode 9 is coated with an insulating layer 43 which is not soluble in the suspending medium. Instead of only the second electrode 9, a first electrode 8 or both the first and second electrodes 8 and 9 can be coated with insulating layers. The layer 43 is applied by coating the second electrode with, for example, vinyl acetate resin, polystyrol, gelatin, cellophane or cellulose acetate. A transparent electrode attached to a transparent housing wall is coated with a transparent insulating layer. The thickness of said layer 43 depends on the electrical resistance which said insulating layer and the electrophoretic suspension layer 22 are required to have. It is preferable for operation at a low voltage that the layer 43 have an electrical resistance no higher than that of the suspension layer 22.

Figure 5:
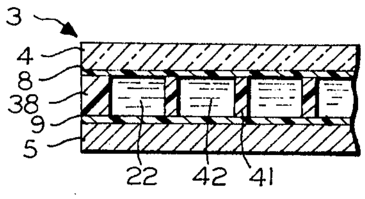
FIG. 5 is a cross-sectional view of still another embodiment of a color image reproduction panel according to this invention.
Figure 6:
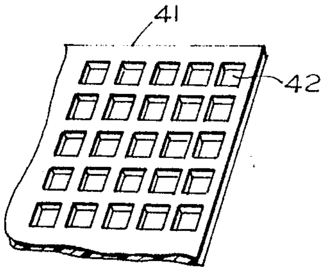
FIG. 6 is a schematic perspective view of a sheet with holes for use in the panel of FIG. 5.

Referring to FIG. 5, wherein similar reference numbers designate components similar to those of the foregoing figures, the suspension layer 22 has a plurality of spacers extending transversely thereof and consists of many small spaces filled with the suspension. An insulating sheet 41 with a lot of holes 42 therein, as shown in FIG. 6, can be used to divide the suspension layer 22 into separate suspension units. The holes 42 can have any suitable shape, such as square, as shown in FIG. 6, circular, rectangular, hexagonal and so on. Holes 42 can be regular or irregular in shape, dimension and order. The dimensions of the holes 42 should be selected according to the purpose of the display or the nature of the suspension, but they must be at least greater than the dimensions of the material in the form of a finely divided powder suspended in the suspension. The advantage of dividing the suspension layer into a plurality of suspension units is that a uniform display can be produced because flow of the suspension is restricted to the interior of each space.

Figure 7:
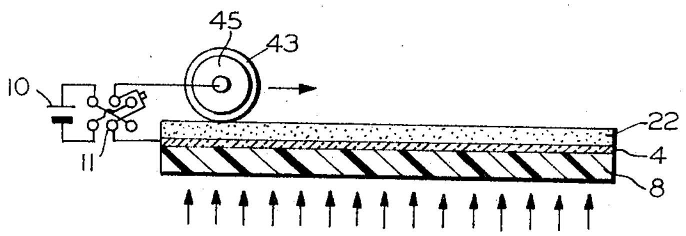
FIG. 7 is a cross-sectional view of a color image reproduction device according to this invention.

Referring to FIG. 7, wherein similar reference numbers designate components similar to those of the foregoing figures, there is shown an electrophoretic suspension layer 22 which is softenable by application of heat or solvent thereto and which covers a first transparent electrode 4 of, for example, tin oxide ($SnO_2$) on a transparent base plate 8 of glass plate. The transparent electrode 4 on the transparent glass plate 8 can be replaced by a transparent cuprous iodide (CuI) layer or thin transparent film of metal on a transparent sheet such as, for example, polyester, cellulose acetate or cellophane. The first transparent electrode 4 is connected, through a switching device 11, to one terminal of a D.C. voltage source 10. A second electrode 45 in a form of a roller is covered with an insulating layer 43 and is connected, through the switching device 11, to another terminal of the D.C. voltage source 10. The second roller electrode 45 rolls along the surface of the electrophoretic suspension layer 22 so as to apply a D.C. electric field to the whole of the suspension layer 22 while a color image is projected, through the first transparent electrode 4, onto the suspension layer 22 which is in a softened state due to the application of heat or a solvent thereto. For example, the roller 45 can be heated so as to soften the suspension layer 22. Thus, for example, a positive color image and negative image are reproduced at the electrode 4 and at the upper surface of the suspension layer 22, respectively. A hard copy can be obtained after the suspension layer 22 is cooled. If necessary, a new image can be reproduced on the suspension layer 22 in a manner similar to that described above.

Figure 8:
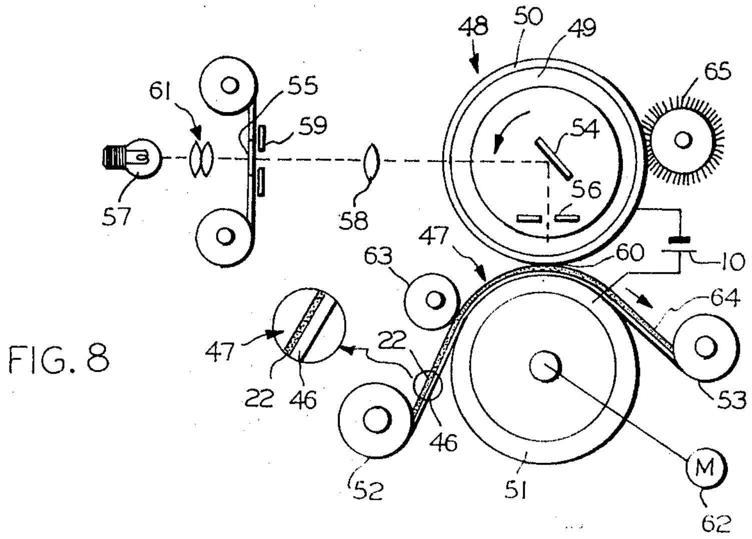
FIG. 8 is a cross-sectional view of another embodiment of a color image reproduction panel according to this invention.

Referring to FIG. 8, wherein similar reference numbers designate components similar to those of the foregoing figures, there is shown an electrophoretic suspension layer 22 which is softenable by application of heat or a solvent and which covers a base sheet 46 such as, for example, paper, plastic sheet or metal foil and together with the base sheet 16 makes up a color image reproduction sheet 47. A first transparent rotary electrode 48 is provided in the form of a drum and is made up of a layer of a transparent glass 49 carrying on its outer surface a transparent conductive layer 50 of tin oxide. A second electrode 51 in the form of a drum is provided and is made up of metal or conductive rubber and is in close proximity to and parallel to the electrode 48. The image reproduction sheet 47 is interposed between the first electrode 48 and the second electrode 51 so that the surfaces of the suspension layer 22 and the base sheet 46 are in contact with the first electrode 50 and the second electrode 51, respectively. Supply reel 52 and a take-up reel 53 are provided for the image reproduction sheet 47. Within the rotary transparent drum 49 is located a stationary, first mirror surface 54 which receives the color image projected from the transparent subject 55 to be copied and directs the reflected image through an exposure slit 56 and onto the surface of the electrophoretic suspension layer 22 at the line of contact where the transparent electrode 50 contacts the electrophoretic suspension layer 22. The transparency 55 that is to be printed is shown passing under a light source 57 and moving synchronously with the rotary drum 48. From the imaging slit 59 and the image formation station or lens 58, the image is projected onto the surface of the first mirror surface 54 and, in turn, reflected onto the surface of the electrophoretic suspension layer 22 at the line of contact 60. The image is preferably projected in a plane normal to the surface of the drum so as to minimize distortion of the image and loss of image density. The first electrode 50 and the second electrode 51 are connected to one and the other terminals of a D.C. voltage source 10, respectively. The image projector made up of light source 57, double lens complex 61, transparency 55 and a single lens 58 is provided to expose the suspension layer 22 to the light image of the original transparency 55 to be reproduced. During imaging, drive means 62 rotates the second electrode 51 synchronously with the transparent electrode 48, thereby carrying the electrophoretic suspension layer 22 into intimate contact with the surface of the transparent electrode 50 at the site of projection of the image from transparency 55 onto the surface of the suspension layer 22 at the line of contact 60. The suspension layer 23 is softened before or while it comes to the line of contact 60. For example, a heated roller 63 in contact with the suspension layer 22 can soften the suspension layer 22 before it reaches the line of contact 60. Instead of a heated roller 63, the drum 48 or the drum 51 can be heated so as to soften the suspension layer 22. The heated roller 63 can be replaced by a solvent vapor source or solvent source which can apply a solvent vapor or solvent to the suspension layer 22 so as to soften it. The color image is thus reproduced on the suspension layer 22 by application of a D.C. voltage and exposure to a color image at the line of contact 60 while the suspension layer is in a softened state, and becomes a hard copy 64 after cooling. A cleaning means 65 is, if necessary, used for cleaning the surface of the transparent electrode 50.

The amount of the photosensitive electrophoretic material in the suspending medium or the thickness of the electrophoretic suspension layer is selected, depending upon: the hiding power, photosensitive property or electrophoretic property of the photosensitive electrophoretic material; the contrast range required in the reproduced image; the feasibility of the voltage source; and so on. Since the image reproduction device of the present invention is a reflective type, the suspension layer must be opaque in order to produce an image of high contrast. The thicker the suspension layer, the higher the applied voltage which is usually required. The thinner the suspension layer, the denser the concentration of the photosensitive electrophoretic material and the color of the colored suspending medium must be to produce an image of high contrast. The thickness of the suspension layer is usually from a few microns to a few mm.

What is claimed is:

1. A color image reproduction device comprising an electrophoretic suspension layer having a white colored suspending medium and at least three differently colored photosensitive electrophoretic materials in the form of finely divided powder suspended in said white colored suspending medium, said at least three differently colored photosensitive electrophoretic materials consisting essentially of cyan colored material which is principally photosensitive to red light, magenta colored material which is principally photosensitive to green light, and yellow colored material which is principally photosensitive to blue light; a substantially transparent first electrode and a second electrode which are spaced from and opposed to each other and are positioned on two opposite major surfaces of said suspension layer, respectively; means coupled to said electrodes for applying a D.C. electric field across the suspension layer between said electrodes; exposing means for exposing said suspension layer to color image through said first electrode, said D.C. electric field changing electrophoretically, in cooperation with said color image, the spatial distribution of said at least three differently colored photosensitive electrophoretic materials so that the optical reflective property of the suspension layer changes in accordance with said color image.

2. A device as claimed in claim 1 wherein said white colored suspending medium is selected from the group consisting of a white colored solution, a liquid having a white colored material in the form of a finely divided powder suspended therein, and a liquid having a white colored porous layer inserted therein.

3. A device as claimed in claim 1 wherein said at least three differently colored photosensitive electrophoretic materials have a charge polarity which can be changed by application of said D.C. electric field in cooperation with exposure to said color image.

4. A device as claimed in claim 1 wherein said at least three differently colored photosensitive electrophoretic materials have an electrophoretic mobility which can be changed by application of said D.C. electric field in cooperation with exposure to said color image.

5. A device as claimed in claim 1 wherein said second electrode is transparent.

6. A device as claimed in claim 1 wherein at least one of said first electrode and second electrode is coated with an insulating layer which is in contact with said electrophoretic suspension layer.

7. A device as claimed in claim 1 wherein said means for applying a D.C. electric field across the suspension layer between said electrodes includes means for controlling said electric field with respect to at least one property selected from the group consisting of strength, length of time of application and polarity.

8. A device as claimed in claim 1 wherein said suspension layer further contains at least one control agent for said photosensitive electrophoretic materials, selected from the group consisting of a charge control agent, a dispersion agent, a sensitizing agent and a fixing agent.

9. A device as claimed in claim 1 wherein said white colored suspending medium is a hardenable material.

10. A device as claimed in claim 1 wherein said white colored suspending medium is heat hardenable.

11. A device as claimed in claim 1 wherein said white colored suspending medium is heat softenable.

12. A device as claimed in claim 1 wherein said white colored suspending medium is solvent softenable.

13. A device as claimed in claim 1 wherein said exposing means includes means for exposing the whole of at least one surface of said suspension layer to light to which said at least three differently colored photosensitive electrophoretic materials are photosensitive so as to erase said color image which is reproduced.

14. A device as claimed in claim 1 wherein said second electrode is a roller.

15. A device as claimed in claim 1 wherein said first electrode is a drum.

16. A device as claimed in claim 1 further including a housing enclosing said suspension layer.

17. A device as claimed in claim 16 wherein said housing has a transparent housing wall covering said transparent first electrode.

18. A device as claimed in claim 16, wherein said suspension layer has a plurality of spacers therein extending transversely thereof.

19. A device as claimed in claim 16, wherein said housing has two spaced opposed major housing walls, and one of said electrodes forms one of said two spaced opposed major housing walls.

20. A device as claimed in claim 16 in which said housing has two spaced opposed major housing walls between which said suspension layer and said electrodes are positioned, and at least one of the housing walls facing said transparent first electrode is transparent.

21. A device as claimed in claim 20, wherein both of said two spaced opposed major housing walls and both of said electrodes are transparent.

References Cited

UNITED STATES PATENTS

| | | | |
|---|---|---|---|
| 3,573,904 | 4/1971 | Clark | 204—180 R |
| 3,145,156 | 8/1964 | Oster | 204—180 R |
| 3,384,565 | 5/1968 | Tulagin et al. | 204—181 |
| 3,510,419 | 5/1970 | Carreira et al. | 204—181 |
| 3,511,651 | 5/1970 | Rosenberg | 204—180 R |

JOHN H. MACK, Primary Examiner

W. I. SOLOMON, Assistant Examiner

U.S. Cl. X.R.

96—1 A; 204—181 PE, 299 PE; 355—3